US012363485B2

(12) United States Patent
Jin et al.

(10) Patent No.: US 12,363,485 B2
(45) Date of Patent: Jul. 15, 2025

(54) FULL-FREQUENCY BAND HIGH QUALITY MEMS MICROPHONE WITH A BAR AND SOUND TUNNELS

(71) Applicant: SUZHOU LI YUE MUSICAL INSTRUMENTS CO., LTD., Jiangsu (CN)

(72) Inventors: Haiou Jin, Suzhou (CN); Nianbo Wu, Suzhou (CN); Xinxi He, Suzhou (CN); Xinzhi Zhu, Suzhou (CN); Biying Li, Suzhou (CN); Ping Yang, Suzhou (CN)

(73) Assignee: SUZHOU LI YUE MUSICAL INSTRUMENTS CO., LTD., Suzhou (CN)

( * ) Notice: Subject to any disclaimer, the term of this patent is extended or adjusted under 35 U.S.C. 154(b) by 283 days.

(21) Appl. No.: 18/026,223

(22) PCT Filed: Dec. 16, 2020

(86) PCT No.: PCT/CN2020/136855
§ 371 (c)(1),
(2) Date: Mar. 29, 2023

(87) PCT Pub. No.: WO2022/036961
PCT Pub. Date: Feb. 24, 2022

(65) Prior Publication Data

US 2023/0336923 A1 Oct. 19, 2023

(30) Foreign Application Priority Data

Aug. 19, 2020 (CN) ......................... 202010838771.3

(51) Int. Cl.
*H04R 19/04* (2006.01)
*H04R 7/12* (2006.01)

(52) U.S. Cl.
CPC ............... *H04R 19/04* (2013.01); *H04R 7/12* (2013.01)

(58) Field of Classification Search
None
See application file for complete search history.

(56) References Cited

U.S. PATENT DOCUMENTS

2010/0166235 A1 7/2010 Zhang
2016/0304337 A1 10/2016 Miao
2020/0112799 A1* 4/2020 Kuntzman ............... H04R 7/18

FOREIGN PATENT DOCUMENTS

CN 101841756 A 9/2010
CN 101883305 A 11/2010
(Continued)

OTHER PUBLICATIONS

Apr. 28, 2021 International Search Report issued in International Patent Application No. PCT/CN2020/136855.
(Continued)

*Primary Examiner* — Kenny H Truong
(74) *Attorney, Agent, or Firm* — Oliff PLC

(57) ABSTRACT

A full-frequency band high quality MEMS microphone with a bar and sound tunnels includes a sensor, acoustic chamber, and circuit board; the sensor includes a diaphragm and silicon back plate; the diaphragm is provided with a bar assembly; the bar assembly includes a plurality of arc-shaped bar members, arranged in a ring, and a gap is formed between the two adjacent members; the diaphragm has an annular area and at least two radial grooves on the same surface with the bar assembly; the radial grooves are arranged radially and uniformly, and then the surface of the diaphragm located outside the bar assembly is divided into multiple resonance regions; the radial grooves and gaps between the two arc-shaped bar members are matched one by one; each radial groove inner end is connected with the
(Continued)

annular area; the radial groove is concave on surface of the diaphragm to form a sound tunnel.

6 Claims, 3 Drawing Sheets

(56) References Cited

FOREIGN PATENT DOCUMENTS

| | | | | |
|---|---|---|---|---|
| CN | 104602173 A | | 5/2015 | |
| CN | 106303868 A | | 1/2017 | |
| CN | 108419193 A | | 8/2018 | |
| CN | 108650596 A | | 10/2018 | |
| CN | 111954138 A | | 11/2020 | |
| DE | 102013211943 A1 | * | 12/2013 | ........... B81B 3/0018 |

OTHER PUBLICATIONS

Feb. 16, 2023 International Preliminary Report on Patentability issued in International Patent Application No. PCT/CN2020/136855.

* cited by examiner

FULL-FREQUENCY BAND HIGH QUALITY MEMS MICROPHONE WITH A BAR AND SOUND TUNNELS

TECHNICAL FIELD

The invention relates to a MEMS microphone, in particular to a full-frequency band high quality MEMS microphone with a bar and sound tunnels.

BACKGROUND TECHNOLOGY

MEMS microphone, also known as Micro-Electro-Mechanical System microphone, is a microphone manufactured based on MEMS technology. Because of its advantages over ECM in terms of miniaturization, performance, reliability, environmental tolerance, cost and production capacity, it has rapidly occupied the consumer market for electronic products such as mobile phones, headphones, PDA, MP3 and hearing aids.

MEMS microphone is composed of MEMS sensor, ASIC chip, acoustic chamber and circuit board with RF suppression circuit. MEMS sensor is a micro-capacitor composed of diaphragm and silicon back plate, which can convert the change of sound pressure into capacitance change and then the capacitance change is converted to electrical signal by ASIC chip to realize the "acoustic-electric" transition.

The common problems of traditional MEMS microphones are:

In view of the inherent resonance frequency of the diaphragm of the MEMS microphone, when receiving the sound waves from the external sound source, if it exceeds a certain range of the resonance frequency area, the treble and bass registers will not be able to effectively resonate; this leads to the problem that the treble is not bright and the bass is not sonorous and mellow enough, which is converted by "sound electricity" and restored by "electricity sound", leading to poor fidelity of the sound.

The main reason is that the current diaphragm can't complete a good broadband vibration between treble and bass register. That is to say, it can't simultaneously adapt to the resonance and vibration with wide-frequency changes of the treble, alto and bass register. The traditional MEMS microphone with unreasonable structure design is not conducive to the sound wave vibration of the diaphragm from treble register to bass register.

Therefore, how to solve the shortcomings of the above existing technologies has become the subject to be studied and solved by the invention.

SUMMARY OF THE INVENTION

The purpose of the invention is to provide a full-frequency band high quality MEMS microphone with a bar and sound tunnels.

To achieve the above purpose, the technical scheme adopted by the invention is:

A full-frequency band high quality MEMS microphone with a bar and sound tunnels comprises a sensor, an acoustic chamber, and a circuit board; the sensor is located in the acoustic chamber and the sensor comprises a diaphragm and a silicon back plate;

the diaphragm is provided with a bar assembly; the bar assembly is fixed on at least one side of the surface of the diaphragm and defines the center of the diaphragm into a central area;

the bar assembly comprises a plurality of arc-shaped bar members, each of which is arranged in a ring around the center of the horizontal direction of the diaphragm, and a gap is formed between the two adjacent arc-shaped bar members;

the diaphragm is also provided with an annular area and at least two radial grooves on the same surface with the bar assembly; the annular area is arranged around the central region and is located between the bar assembly and the central region;

The radial grooves are arranged radially and uniformly based on the center of the diaphragm in the horizontal direction, and then the surface of the diaphragm located outside the bar assembly is divided into multiple resonance regions;

The radial grooves and the gaps between the two arc-shaped bar members are matched one by one; the radial groove is penetrated in the gap and the inner end of each radial groove is connected with the annular area; the radial groove is concave on the surface of the diaphragm to form a sound tunnel.

Relevant contents of the above technical scheme are explained as follows:

1. In the above scheme, "the annular area is arranged around the central region and is located between the bar assembly and the central region". This design helps the annular area to gather the vibration of the central region of the diaphragm. The annular area may be an annular groove.
2. In the above scheme, "The radial grooves are arranged radially and uniformly based on the center of the diaphragm in the horizontal direction". It is helpful to rapidly transmit the vibration in the central region to the surrounding of the diaphragm through the radial sound tunnels (i.e. the tunnel of sound) formed by the radial grooves.
3. In the above scheme, the diaphragm is divided into a treble region in the outer section, an alto region in the middle section and a bass region in the inner section according to sound frequency band; the bar assembly is located in the bass region. The wall thickness of the diaphragm is gradually increased from the periphery to the center, and the wall thickness of the bass region is greater than the wall thickness of the alto region, and the wall thickness of the alto region is greater than the wall thickness of the treble region.

In this design, by setting the thicker bass region close to the center, the bass region of the diaphragm can more easily resonate with the low-frequency vibration with lower frequency and larger amplitude, so that the restored sound will produce a sonorous and mellow bass; By setting the thinner treble region away from the center, the treble region of the diaphragm is more likely to resonate with high-frequency vibration with higher frequency and smaller amplitude, making the restored sound produce more transparent and bright treble, thus enabling the MEMS microphone to resonate effectively in the full frequency band, effectively improving the timbre and sound quality of the restored sound, and achieving the effect of high fidelity.

4. In the above scheme, the radial groove is penetrated in the gap. With this design, it is beneficial to transmit vibration through the sound tunnels, which is more beneficial to improve the vibration response rate of the diaphragm.
5. In the above scheme, when the diaphragm is horizontal, the center line of the upper and lower directions of the bar assembly overlaps with the center line of the upper and lower directions of the diaphragm to improve the sound quality and timbre.

5. In the above scheme, The annular area is an annular groove.
6. In the above scheme, the radial grooves and the annular grooves are arc grooves, which minimize the thickness mutation of the diaphragm and avoid affecting the resonance and vibration of the diaphragm.
7. In the above scheme, a smooth transition surface is set between the outer end of the radial groove and the surface of the diaphragm.

The working principle and advantages of the invention are as follows:

The invention discloses a full-frequency band MEMS microphone with a bar and sound tunnels, including a sensor, an acoustic chamber and a circuit board; The sensor comprises a diaphragm and a silicon back plate; The diaphragm is provided with a bar assembly, which is fixed on at least one side of the surface of the diaphragm, and defines the center of the diaphragm into a central area;

The bar assembly comprises a plurality of arc-shaped bar members; the arc-shaped bar member are arranged in a ring, and a gap is formed between two adjacent arc-shaped bar members;

The diaphragm is also provided with an annular area and at least two radial grooves on the surface with the bar assembly; The annular area is arranged around the central area, and the radial grooves are arranged radially and evenly, dividing the diaphragm surface located outside the bar assembly into multiple resonance areas; The gap between the radial groove and the two arc-shaped bar members is arranged one by one, and the inner end of each radial groove is connected with the annular area; The radial groove is concave on the surface of the diaphragm to form a sound tunnel.

Compared with the prior art, in order to solve the problem that the existing MEMS microphone can not receive sound at the same time with good resonance in the treble, alto and bass registers, the invention improves the existing MEMS microphone, especially the diaphragm of the MEMS microphone. It is embodied in the following aspects: First, set up a bar assembly on the surface of the diaphragm; Secondly, radial grooves are set on the surface of the diaphragm, which forms radial sound tunnels on the surface of the diaphragm.

The invention aims at the problem that the treble register of the restored sound after the existing MEMS microphone receives the sound is not bright enough, and the bass register is not sonorous and round enough. The design and vibration mechanism of the MEMS microphone are deeply discussed and studied, and it is found that the main reason for the poor vibration of the existing MEMS microphone receiving the treble register and the bass register is due to the unreasonable design of the diaphragm. Accordingly, the inventor broke the shackles of the previous composition design of the MEMS microphone and boldly proposed the improved design scheme of the invention. This improved design scheme changes the vibration mode of the diaphragm from the former free vibration mode to the current standard vibration mode. From the perspective of vibration and resonance, it solves the problem that MEMS microphone cannot effectively resonate the sound details of the full frequency band when receiving sound, resulting in that the restored sound's high register is not bright enough, and the bass register is not sonorous and round enough. The practice proves that the improved scheme has outstanding substantive characteristics and remarkable technical progress, and has obtained obvious technical results.

Due to the application of the above technical scheme, the invention has the following advantages and effects compared with the previous diaphragm of MEMS microphone:

The invention sets a bar assembly on the surface of the diaphragm. Because of the large amplitude and low frequency of the bass relative to the treble, the bass resonance is concentrated in the central region of the diaphragm, and the treble resonance is concentrated in the surrounding edge region of the diaphragm, which enhances the strength of the central region of the diaphragm, and plays an important role in improving the bass timbre and quality of high fidelity. Because the thickness of the diaphragm is gradually changed from thick in the central area to thin in the surrounding area (thin on the outside and thick in the center), the strength of the central area of the diaphragm is strengthened, and the thickness difference between the central area of the diaphragm and the surrounding edge area is relatively changed, which can also play a beneficial role in improving high fidelity treble timbre and quality.

2. The invention is provided with radial grooves on the surface of the diaphragm, and the radial groove actually forms a radial sound tunnel on the diaphragm. After receiving the vibration, the diaphragm rapidly transmits to the surrounding edge of the diaphragm through the radial sound tunnels (namely, the tunnel of sound), which plays a key role in improving the resonance of the treble and can better receive the details of the high pitch band of the sound.
3. The bar is designed into a bar assembly in the invention. In particular, there is a gap designed between the two arc-shaped bar members, so the use of gap is more conducive to the transmission of vibration through sound tunnel, so as to be more conducive to the resonance and rapid vibration response of diaphragm.
4. Through the design of bar assembly and radial grooves, N resonance areas with the same number of grooves are separated in the diaphragm. When the MEMS microphone works, the vibration is first transmitted to the central region of the diaphragm, and then transmitted to each resonance region through the sound tunnels, and produces resonance and vibration, so as to amplify the vibration of the external sound source into the resonance of the diaphragm. Each resonance region can produce one acoustic wave quantity, plus one original acoustic wave quantity, a total of N+1 acoustic wave quantity. The quantity of acoustic wave is the number of sound wave, which directly affects the timbre and sound quality of diaphragm. Therefore, the invention can obviously improve the timbre and sound quality of the treble and bass registers.
5. The bar assembly and grooves of the invention can be arranged on the upper surface of the diaphragm, or on the lower surface of the diaphragm, and can also be respectively arranged on the upper and lower surfaces of the diaphragm at the same time.

Figure 1:
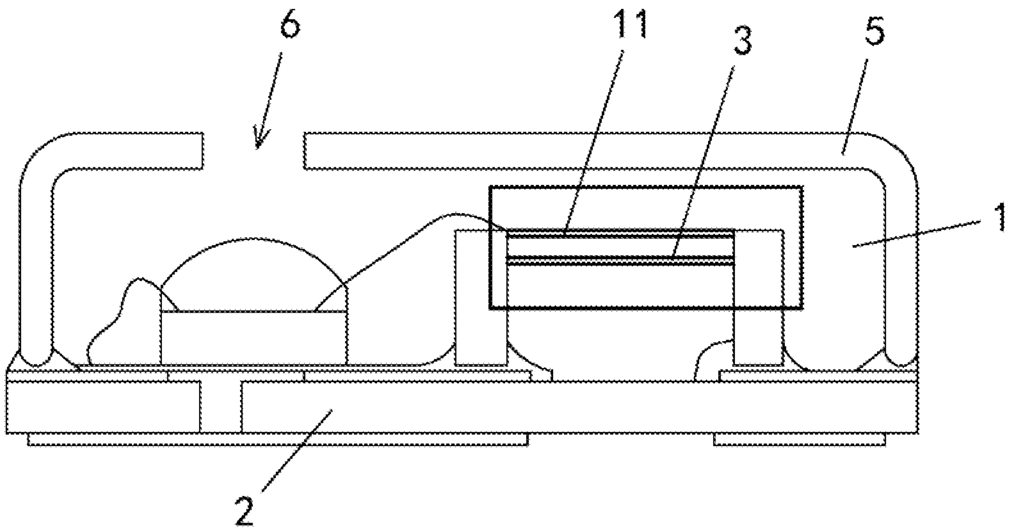
FIG. 1 is a schematic diagram of the MEMS microphone structure of the invention (the sound inlet hole is located on the upper side)
Figure 2:
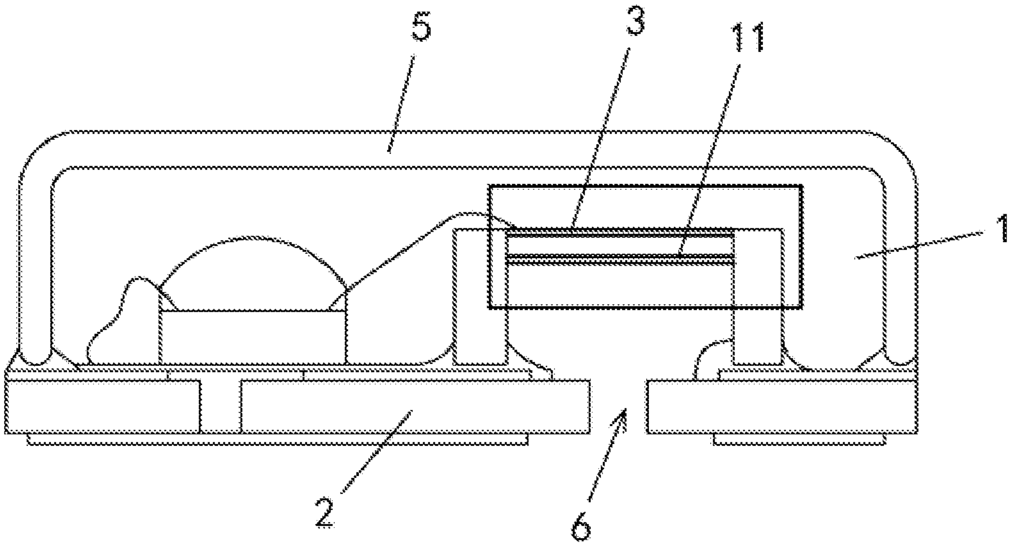
FIG. 2 is a schematic diagram of the MEMS microphone structure of the invention (the sound inlet is located at the lower side)
Figure 3:
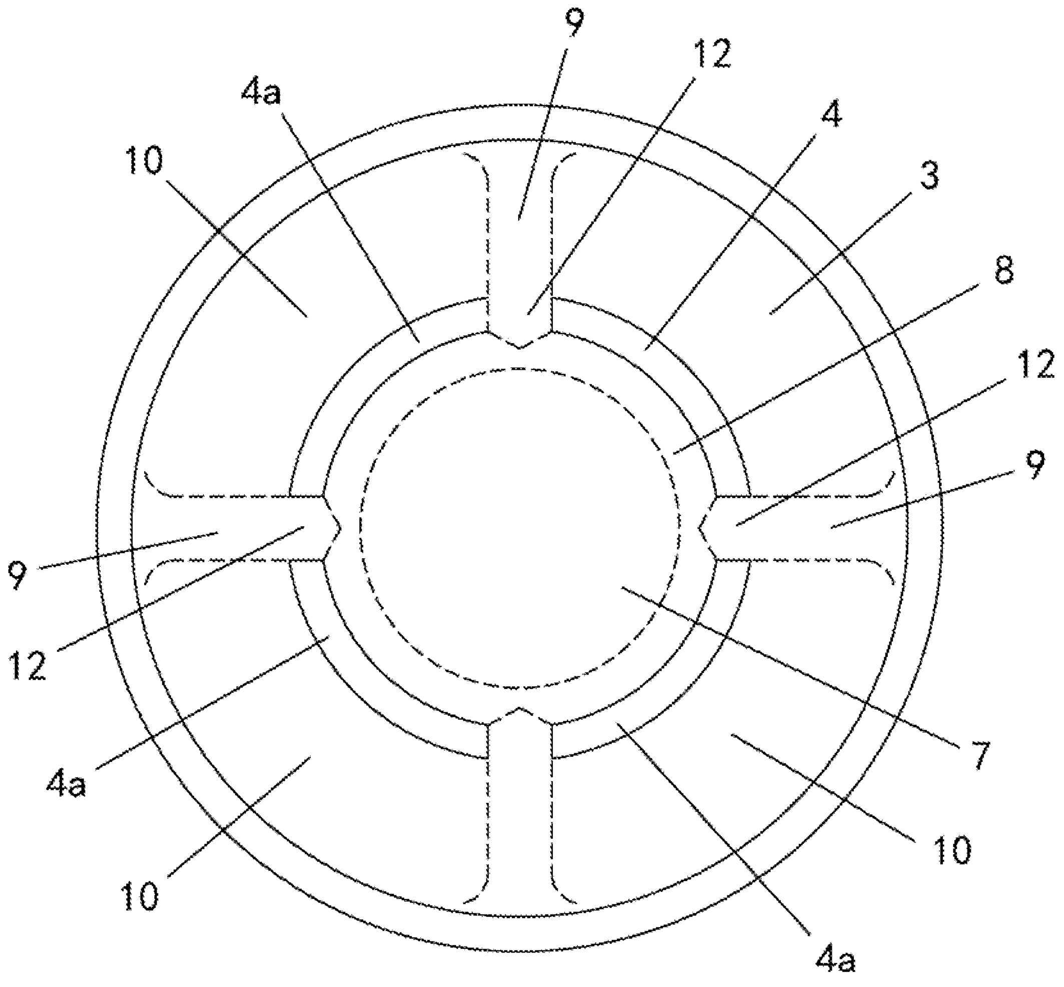
FIG. 3 is a structural diagram of the diaphragm in the embodiment of the invention.

In the above figures: 1. acoustic chamber; 2. circuit board; 3. diaphragm; 4. bar assembly; 4*a*. arc-shaped bar member; 5. shell; 6. sound inlet hole; 7. central region; 8. annular area; 9. radial groove; 10. resonance region; 11. silicon back plate; 12. gap.

Specific Implementation

The invention is further described in combination with the attached figures and embodiments below:

Embodiment: The present invention will be clearly explained by the following schematics and detailed descriptions. Any person skilled in the field, after learning the embodiments of the present invention, may change and modify them by the techniques taught by the present invention, which is not out of the spirit and scope of the present invention.

The terms used herein are only for describing specific embodiments, and are not intended to limit the case. Singular forms such as "one", "this", "the" as used herein, also include plural forms.

As used herein, "connection" or "positioning" can refer to two or more components or devices making physical contact with each other directly or indirectly, and can also refer to two or more components or devices operating or acting with each other.

The terms "comprise", "including", "provided", and etc. used in this article are all open terms, which means including but not limited to.

The terms used in this article, unless otherwise specified, usually have the common meaning of each word used in this field, in the content of this case and in the special content. Some words used to describe the invention will be discussed below or elsewhere in this specification to provide additional guidance for those skilled in the art on the description of the case.

The words "upper" and "lower" used in this article are directional words. In this invention, they are only used to describe the position relationship between the structures, not to define the specific direction of the protection scheme and actual implementation of the invention.

See FIGS. 1-4, a full-frequency band high quality MEMS microphone with a bar and sound tunnels, comprises a MEMS sensor, an acoustic chamber, and a circuit board; the MEMS sensor is located in the acoustic chamber 1 and the MEMS sensor comprises a diaphragm 3 and a silicon back plate 11, which are set at intervals, and the silicon back plate 11 corresponds to a sound inlet hole 6 on the MEMS microphone shell 5.

The diaphragm 3 is provided with a bar assembly 4; the bar assembly 4 is fixed on the lower surface of the diaphragm 3 and defines the center of the diaphragm 3 into a central area 7;

the bar assembly 4 comprises a plurality of arc-shaped bar members 4*a*, each of which is arranged in a ring around the center of the horizontal direction of the diaphragm, and a gap 12 is formed between the two adjacent arc-shaped bar members 4*a;*

The diaphragm 3 is also provided with an annular area 8 and at least two radial grooves 9 on the lower surface; the radial groove 9 is concave on the surface of the diaphragm 3 to form a sound tunnel.

The annular area 8 is arranged around the central region 7 and is located between the bar assembly 4 and the central region 7; This design helps annular area 8 to play a gathering role in the vibration of the central region of diaphragm 3. The annular area 8 may be an annular groove.

The radial grooves 9 are arranged radially and uniformly based on the center of the diaphragm 3 in the horizontal direction. It helps to transmit the vibration of central region 7 to the surrounding of diaphragm 3 rapidly through the radial sound tunnels formed by radial grooves 9.

At the same time, the surface of the diaphragm 3 located on the outside of the bar assembly 4 is equally divided into a plurality of resonance areas 10. The radial groove 9 and the gap 12 between the two arc-shaped bar members 4*a* are matched one by one, and the radial groove 9 passes through the gap 12, and the inner ends of each radial groove 9 are connected with the annular area 8.

By setting the bar assembly 7 on the lower surface of the diaphragm 3, due to the large amplitude and low frequency of the bass relative to the treble, the bass resonance is concentrated in the central area of the diaphragm 3, and the treble resonance is concentrated in the surrounding edge area of the diaphragm 3, strengthening the strength of the central area of the diaphragm 3, which plays an important role in improving the bass timbre and quality of high fidelity. Because the thickness of diaphragm 3 is thick in the central area and thin in the surrounding area, the thickness gradient structure (that is, thin outside and thick inside) strengthens the strength of the central area of diaphragm 3, and relatively changes the thickness difference between the central area and the surrounding edge area of diaphragm 3, which also play a beneficial role in improving high fidelity treble timbre and tone quality.

By setting radial grooves 9 on the lower surface of diaphragm 3, the radial groove 9 actually forms a radial sound tunnel on the surface of diaphragm 3. The vibration is collected through annular area 8, and then transmitted to the surrounding edge of diaphragm 3 rapidly through radial sound tunnel (namely, the tunnel of sound). At the same time, four resonance regions 10 are divided on diaphragm 3. Vibrations can be transmitted to the four resonance regions 10 through the sound tunnel, and resonance will be generated, which can significantly improve the timbre of the bass register and treble register.

Preferred, The diaphragm 3 is divided into a treble region in the outer section, an alto region in the middle section and a bass region in the inner section according to sound frequency band. The wall thickness of the diaphragm 3 is gradually increased from the periphery to the center, and the wall thickness of the bass region is greater than the wall thickness of the alto region, and the wall thickness of the alto region is greater than the wall thickness of the treble region; The bar assembly 4 is located in the bass region, which lift the middle load of diaphragm 3.

In this design, by setting the thicker bass region near the center, the bass region of diaphragm 3 is easier to resonate with the low frequency and large amplitude vibration, so that the restored sound emits a more thick, rounded bass; By setting the thin treble region far away from the center, it is easier for the treble region of diaphragm 3 to resonate with the high frequency vibration with higher frequency and smaller amplitude, so that the restored sound can emit a more transparent and bright treble. Thus, the MEMS microphone can effectively resonate in the full frequency band, so that the timbre and quality of the restored sound can be effectively improved, and the effect of high fidelity can be achieved.

A gap 12 is designed between the two arc-shaped bar members 4*a*, and the radial groove 9 is penetrated in the gap 12. This design is conducive to the transmission of vibration through the sound tunnel, so as to improve the vibration response rate of diaphragm 3.

Preferred, when the diaphragm 3 is horizontal, the center line of the upper and lower directions of the bar assembly 4 overlaps with the center line of the upper and lower directions of the diaphragm 3.

Preferred, the annular grooves and the radial grooves 9 are arc grooves, which minimize the thickness mutation of the diaphragm 3 and avoid affecting the resonance and vibration of the diaphragm 3.

A smooth transition surface is set between the outer end of the radial groove 9 and the surface of the diaphragm 3. So that the vibration can be transmitted to the periphery of diaphragm 3 more evenly.

Figure 4:
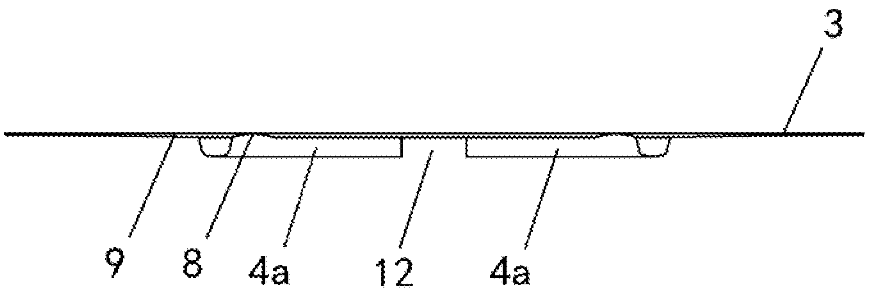
FIG. 4 is a top view of FIG. 3.
Figure 5:
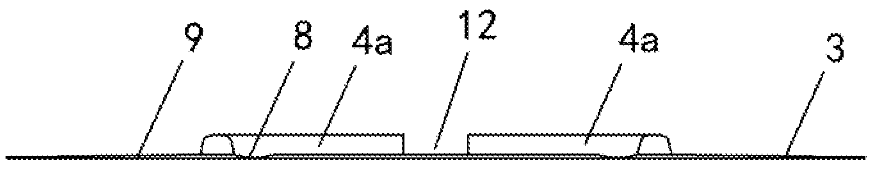
FIG. 5 is a schematic diagram of the bar assembly in the embodiment of the invention when it is installed on the upper surface of the diaphragm.
Figure 6:
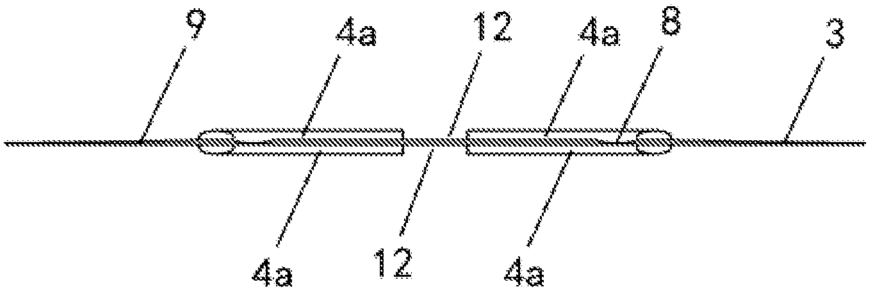
FIG. 6 is a schematic diagram of the bar assembly in the embodiment of the invention when it is installed on the upper and lower surfaces of the diaphragm at the same time.

Other implementations and structural changes of the invention are described as follows:

1. In the above embodiments, the MEMS microphone shown in the figures is only for illustration, and its structure is not used to limit the scope of protection of the invention. If other MEMS microphones with similar structure adopt the technical features of the invention, they should be included in the scope of protection of the invention.
2. In the above embodiment, the number of the bar assembly 4 is not limited to one group, but may also be multiple groups or other designs that contribute to strengthening the load in the middle of diaphragm 3, which is easily understood and accepted by those skilled in the art.
3. In the above embodiment, the bar assembly 4, the annular area 8 and the radial groove 9 may be located on the lower surface of diaphragm 3 (as shown in FIG. 4), the upper surface of diaphragm 3 (as shown in FIG. 5), or the upper and lower surfaces of diaphragm 3 (as shown in FIG. 6) at the same time.
4. In the above embodiment, the annular groove and the radial groove 9 are arc grooves. But the invention is not limited to this, the annular groove and radial groove 9 can be designed into other shapes, such as V shape, U shape, W shape, and other concave structure. This is easily understood and accepted by those skilled in the art.
5. In the above embodiment, the diaphragm 3 can be silicon diaphragm (electrode+monocrystalline silicon or polycrystalline silicon or silicon nitride), or other materials with the same or similar function and effect.

Compared with the prior art, in order to solve the problem that the existing MEMS microphone can not receive sound at the same time with good resonance in the treble, alto and bass registers, the invention improves the existing MEMS microphone, especially the diaphragm of the MEMS microphone. It is embodied in the following aspects: First, set up a bar assembly on the surface of the diaphragm; Secondly, radial grooves are set on the surface of the diaphragm, which forms radial sound tunnels on the surface of the diaphragm.

The invention aims at the problem that the treble register of the restored sound after the existing MEMS microphone receives the sound is not bright enough, and the bass register is not sonorous and round enough. The design and vibration mechanism of the MEMS microphone are deeply discussed and studied, and it is found that the main reason for the poor vibration of the existing MEMS microphone receiving the treble register and the bass register is due to the unreasonable design of the diaphragm. Accordingly, the inventor broke the shackles of the previous composition design of the MEMS microphone and boldly proposed the improved design scheme of the invention. This improved design scheme changes the vibration mode of the diaphragm from the former free vibration mode to the current standard vibration mode. From the perspective of vibration and resonance, it solves the problem that the treble of the sound restored by MEMS microphone after receiving the sound is not bright, while the bass is not sonorous and mellow enough, and improves the fidelity of the sound in each frequency band. The practice proves that the improved scheme has outstanding substantive characteristics and remarkable technical progress, and has obtained obvious technical results.

The above embodiments are only intended to illustrate the technical conception and characteristics of the invention, and enable persons familiar with the technology to understand the content of the invention and implement it accordingly, but don't limit the scope of protection of the invention. Any equivalent variation or modification made in accordance with the spirit substance of the invention shall be covered by the protection of the invention.

The invention claimed is:

1. A full-frequency band high quality MEMS microphone with a bar and sound tunnels, wherein:

it comprises a sensor, an acoustic chamber, and a circuit board; the sensor is located in the acoustic chamber and the sensor comprises a diaphragm and a silicon back plate;

wherein, the diaphragm is provided with a bar assembly the bar assembly is fixed on at least one side of the surface of the diaphragm and defines the center of the diaphragm into a central area;

the bar assembly comprises a plurality of arc-shaped bar members, each of which is arranged in a ring around the center of the horizontal direction of the diaphragm;

a gap is formed between two adjacent arc-shaped bar members;

the diaphragm is also provided with an annular area and at least two radial grooves on the same surface with the bar assembly; the annular area is arranged around the central area and is located between the bar assembly and the central area;

the radial grooves are arranged radially and uniformly based on the center of the diaphragm in the horizontal direction, and then the surface of the diaphragm located outside the bar assembly is divided into multiple resonance regions;

the radial grooves and the gaps between the two arc-shaped bar members are matched one by one; the radial groove is penetrated in the gap and the inner end of each radial groove is connected with the annular area; and wherein, the radial groove is concave on the surface of the diaphragm to form a sound tunnel.

2. The full-frequency band high quality MEMS microphone according to claim 1, wherein:

the diaphragm is divided into a treble region in an outer section, an alto region in a middle section and a bass region in an inner section according to sound frequency band;

a wall thickness of the diaphragm is gradually increased from the periphery to the center, and a wall thickness of the bass region is greater than a wall thickness of the alto region, and the wall thickness of the alto region is greater than a wall thickness of the treble region; and the bar assembly is located in the bass region.

3. The full-frequency band high quality MEMS microphone according to claim 1, wherein: when the diaphragm is horizontal, a center line of the upper and lower directions of the bar assembly overlaps with a center line of the upper and lower directions of the diaphragm.

4. The full-frequency band high quality MEMS microphone according to claim 1, wherein: the annular area is an annular groove.

5. The full-frequency band high quality MEMS microphone according to claim 4, wherein: the radial grooves and the annular grooves are arc grooves.

6. The full-frequency band high quality MEMS microphone according to claim 1, wherein: a smooth transition surface is arranged between an outer end of the radial groove and the surface of the diaphragm.

* * * * *